Dec. 3, 1968    J. HOEKSTRA    3,414,522
THROTTLING LIQUID STREAMS CONTAINING PARTICLE-FORM SOLIDS
Filed July 28, 1965    4 Sheets-Sheet 1
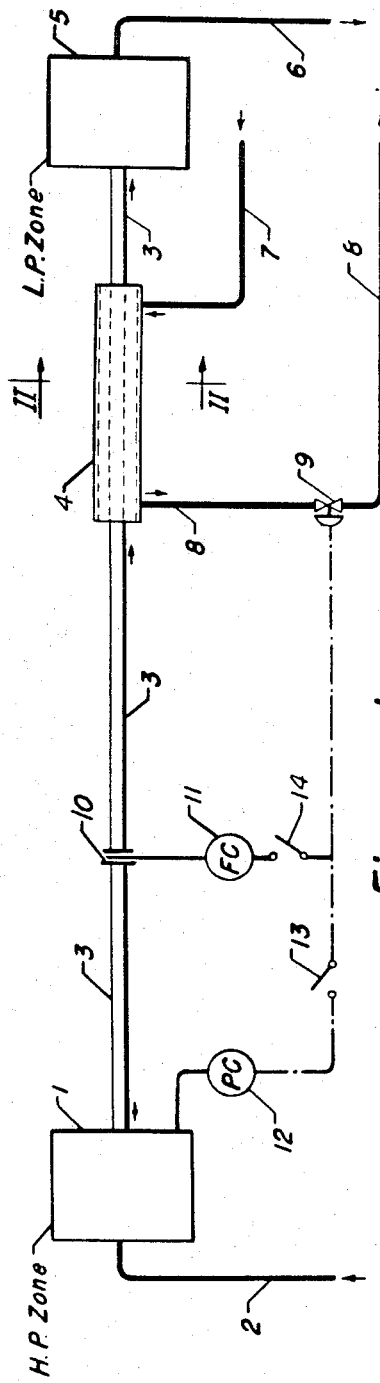
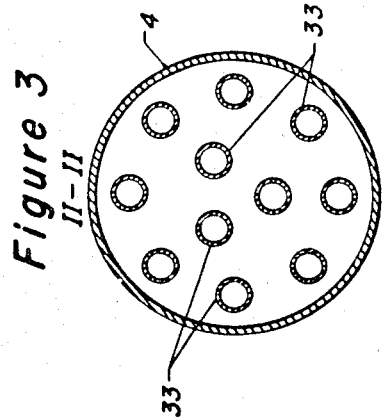
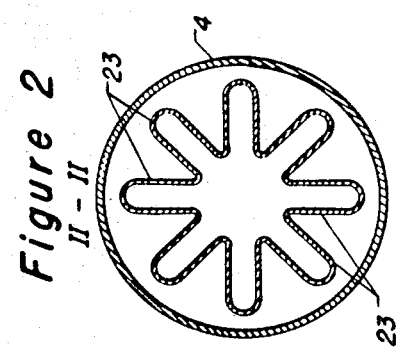
INVENTOR:
James Hoekstra
BY: Chester J. Giuliani
James R. Hoatson Jr.
ATTORNEYS Dec. 3, 1968  J. HOEKSTRA  3,414,522
THROTTLING LIQUID STREAMS CONTAINING PARTICLE-FORM SOLIDS
Filed July 28, 1965  4 Sheets-Sheet 2

INVENTOR:
James Hoekstra
BY: Chester J. Giuliani
James R. Hoatson Jr.
ATTORNEYS

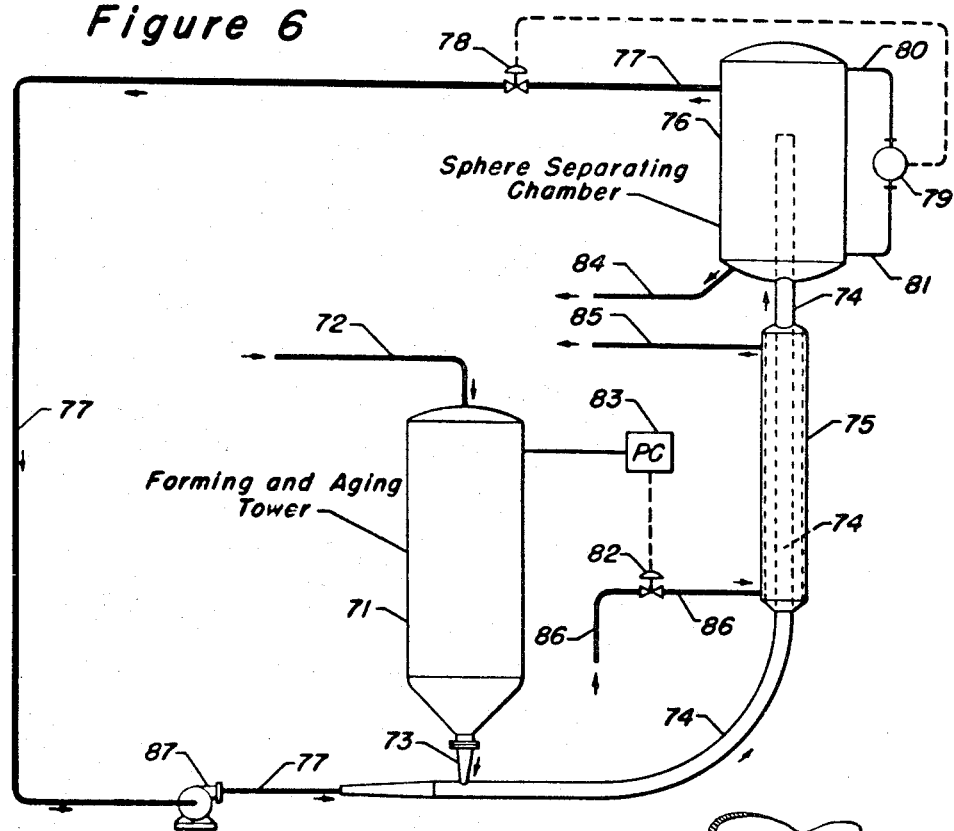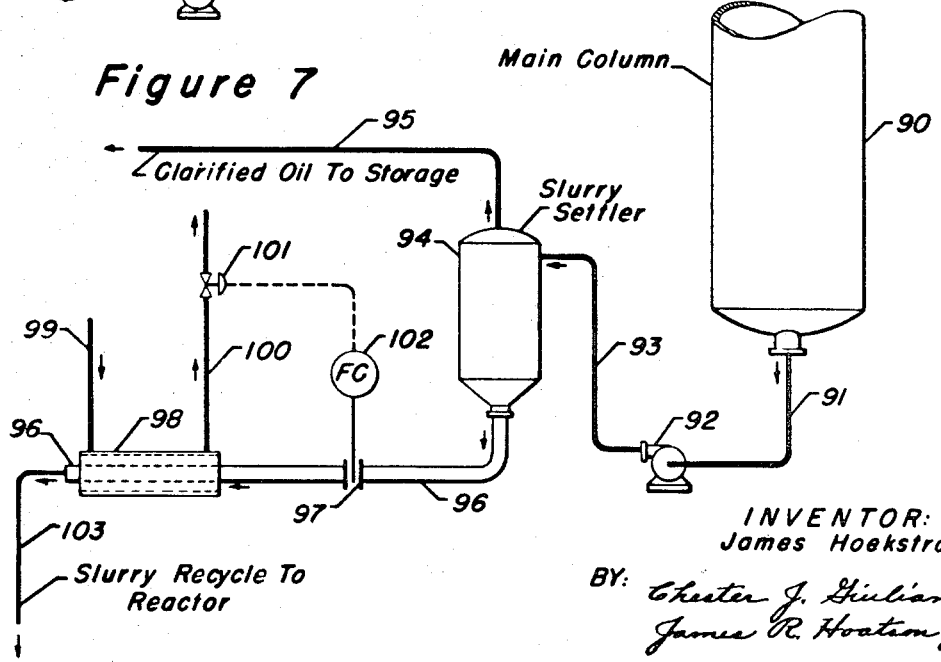

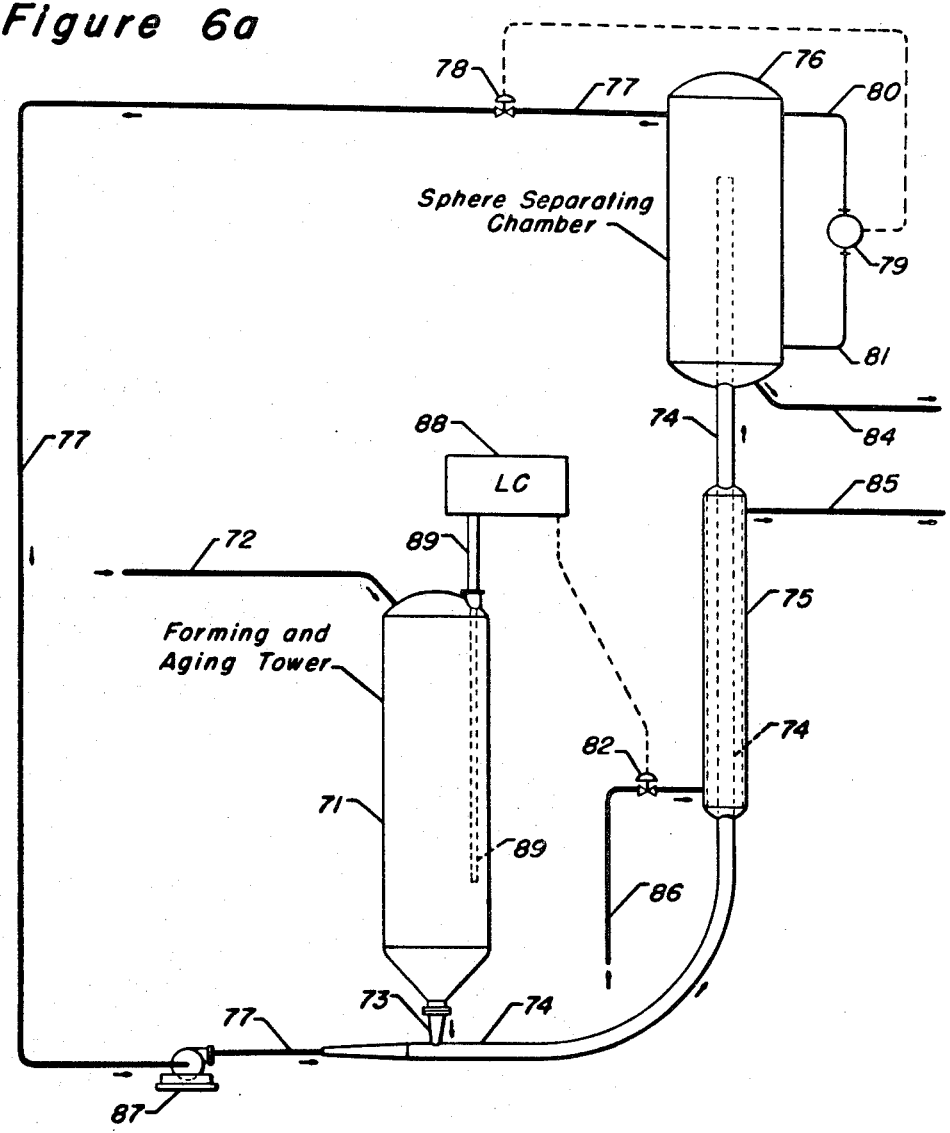

3,414,522
THROTTLING LIQUID STREAMS CONTAINING
PARTICLE-FORM SOLIDS
James Hoekstra, Evergreen Park, Ill., assignor to Universal
Oil Products Company, Des Plaines, Ill., a corporation
of Delaware
Continuation-in-part of application Ser. No. 79,662,
Dec. 30, 1960. This application July 28, 1965, Ser.
No. 479,030
8 Claims. (Cl. 252—317)

ABSTRACT OF THE DISCLOSURE

Method of transferring a solids-containing liquid stream from a high pressure zone to a low pressure zone, without use of a control valve, by passing said stream through an unobstructed elongated conduit sized to impose substantial frictional pressure loss on the stream, and varying the viscosity of the stream flowing therethrough in such a manner as to regulate some other process variable such as flow rate or pressure. Stream viscosity is preferably varied by heating or cooling. Specific applications of this method include transfer of hydrogel spheres in a catalyst manufacturing process, and control of slurry streams in a fluid catalytic cracking process.

---

This application is a continuation-in-part of application Ser. No. 79,662, filed Dec. 30, 1960, which in turn is a continuation-in-part of application Ser. No. 668,389, filed June 27, 1957, both of said prior applications being now abandoned.

The present invention relates to a method of throttling liquid streams containing particle-form solids and more particularly it is directed to a method of controlling a process variable which is responsive to variations in the flow rate of such liquid stream by subjecting the flowing liquid to a variable flow resistance obtained without the use of an on-line control valve or other variable-area flow-obstructing means.

The throttling of fluid streams is conventionally and almost universally effected by means of a control valve or other variable-area flow-restricting means. The degree of opening, as determined by the valve stem position, establishes the degree of flow resistance to which the fluid stream is subject. The objective of such throttling may be to control upstream or downstream pressure, at constant flow the differential pressure across the valve increasing as valve opening is decreased, and conversely; or to control or vary the flow rate of the fluid stream, at constant pressure drop the flow rate decreasing as valve opening decreases, and conversely; or to regulate some process variable whose magnitude is directly or indirectly responsive to, or affected by, changes in the flow rate of the fluid stream. Such process variable may be temperature, pressure, liquid level, material composition as measured by a process stream analyzer such as a differential refractometer, chromatograph, dielectric constant transducer, etc., or any other process variable which may be indicative of the state of the process.

However, the throttling of liquid streams containing particle-form solids by means of a control valve often presents special problems which render the use of such valve extremely undesirable, or at best, its use represents a compromise solution. A typical example is in the manufacture of spherical catalyst particles wherein the particles are formed in a liquid medium under high pressure and, while still soft and fragile, must be transported from the high pressure forming and aging zone to a low pressure zone for separation from the aging medium; if the liquid medium containing the fragile spherical particles in suspension were passed to the low pressure zone through a flow-restricting or obstructing means, the spheres would be disintegrated upon impact against the valve plug, seat, or other obstructing surface therein. Another example is the transport of liquid slurries of hard and abrasive particles such as is encountered in fluid catalytic cracking, suspensoid-type hydrocracking processes, solids classification and size reduction operations, and the like. In these cases, the particles tend to clog the valve opening and to rapidly erode the valve internals, particularly the plug, stem and seat. Even where the valve trim is coated with or fabricated of special and very costly super-hard materials, the valve trim must nevertheless be replaced in a matter of weeks in very severe slurry service.

The present invention obviates the aforesaid difficulties by eliminating altogether the on-line control valve or other flow-restricting means. In accordance with this invention, the liquid stream containing particle-form solids is passed from a high pressure zone to a low pressure zone through an elongated unobstructed conduit; the length and diameter of this conduit is so proportioned according to customary line-sizing formulae and taking into account the design flowing conditions of flow rate, density, viscosity, solids content, etc., that substantially the entire frictional pressure loss undergone by the liquid stream, exclusive of entrance and exit losses, is expended in the unobstructed conduit. The frictional pressure loss may be less than, equal to, or greater than the net pressure differential existing between the high pressure and low pressure zones depending upon whether the low pressure zone is at a higher, or equal, or lower elevation, respectively, than the high pressure zone. This frictional pressure loss is then varied, not by changing the internal area of the conduit as where a valve is employed, but by varying the viscosity of the flowing liquid stream within the conduit so that the effective flow resistance of the elongated conduit is correspondingly varied; that is to say, an increase in flowing viscosity increases the pressure drop at constant flow rate, or decreases the flow rate at constant pressure drop; conversely, a decrease in flowing viscosity decreases the pressure drop at constant flow rate or increases the flow rate at constant pressure drop. Of course, the flow rate and pressure drop may both vary in many situations, but nevertheless a net throttling effect is imposed on the liquid stream just as if the transverse flow area of the conduit were constricted or expanded.

The viscosity of the flowing solids-containing liquid stream may be varied in any one of several, although not necessarily equivalent, ways. One of the most practical methods of changing the viscosity is by varying the temperature of the liquid, preferably by indirect heat exchange with a heating medium, or with a cooling medium, or by means of a combination of heating and cooling. Increasing the temperature of any liquid, of course, decreases its viscosity, and conversely. A second method of changing the viscosity is by adding a fluid of substantially different viscosity than the stream to be throttled, such fluid being either liquid or gas. A more detailed treatment of these several techniques will be set forth below in connection with a discussion of the different embodiments of this invention.

In one embodiment, this invention relates to a method of regulating flow rate in a continuous flow process involving the step of passing liquid stream containing particle-form solids from a high pressure zone to a low pressure zone; which method comprises sensing said flow rate in relation to a predetermined control point, passing the liquid stream from said high pressure zone to said low pressure zone through an unobstructed elongated conduit, expending in said conduit as frictional pressure loss substantially the entire portion of the total frictional pressure drop undergone by said liquid stream in its passage between said zones, and, upon incipient variation in said sensed flow rate, changing the viscosity of the liquid in said conduit in a manner to restore said flow rate to said control point, the effective flow resistance of said conduit being increased upon raising said viscosity and decreased upon lowering said viscosity.

Another embodiment of this invention is directed to a method of regulating the pressure of a liquid-filled high pressure zone involving the step of passing a liquid stream containing particle-form solids from said high pressure zone to a low pressure zone, which method comprises sensing said pressure in relation to a predetermined control point, passing the liquid stream from said high pressure zone to said low pressure zone through an unobstructed elongated conduit, expending in said conduit as frictional pressure loss substantially the entire portion of the total frictional pressure drop undergone by said liquid stream in its passage between said zones, and, upon incipient variation in said sensed pressure, changing the viscosity of the liquid in said conduit in a manner to restore said pressure to said control point, the effective flow resistance of said conduit being increased upon raising the viscosity and decreased upon lowering the viscosity, whereby to throttle such stream and control said higher pressure at said control point.

A more specific embodiment of the present invention relates to a method of transferring hydrogel spheres wherein a hydrosol is introduced in the form of droplets into a gelling medium maintained as a column within a pressure vessel and the resulting hydrogel spheres are then removed to a zone of lower pressure, which method comprises discharging the hydrogel spheres from the lower portion of said column through an unobstructed passageway into a flowing stream of liquid, passing the liquid stream containing the hydrogel spheres in suspension upwardly through an unobstructed elongated conduit to said zone of lower pressure, expending in said conduit as frictional pressure loss substantially the entire portion of the total frictional pressure drop undergone by said liquid stream in its passage to said lower pressure zone, sensing the liquid pressure within said pressure vessel in relation to a predetermined control point, and upon incipient variation in said sensed pressure, changing the viscosity of the liquid in said conduit in a manner to restore said pressure to said control point, the effective flow resistance of said conduit being increased upon raising said viscosity and decreased upon lowering said viscosity, whereby to throttle said stream and control the pressure within said pressure vessel at said predetermined control point.

In order better to delineate the scope of the present invention, certain of the language employed in the specification and in the appended claims is herein defined as follows: the terms "high pressure zone" and "low pressure zone" are strictly relative and are not intended to connote any fixed level of pressure or range of pressures; rather, the former is at some higher pressure, however slight, than the latter so that when the two zones are connected by conduit means there will be a net driving force available which causes or tends to cause fluid flow therethrough from the high pressure zone to the low pressure zone without the necessity for external work being performed on the system; for example, the high pressure zone may be at a pressure of several thousand p.s.i.g. or several inches of water absolute, and the low pressure zone at some lower value in each instance. The particle-form solids-containing liquid stream includes any moving mass of conduit-confined liquid, whether under turbulent flow or laminar flow conditions, which contains discrete particles of solid material entrained or suspended therein, which particles are more or less insoluble in the liquid medium at least during the transitory period in moving between the zones; the particles may be relatively hard and abrasive materials such as stones, gravel, clinkers, glass, coal fines, silica fines, silica-alumina cracking catalyst, etc., or relatively soft materials such as freshly formed alumina or alumina-containing spheres, kaolin, zeolitic adsorbents, etc.: the liquid may be water, hydrocarbon or any other material which is in the liquid state under the flowing conditions of the particular process and which is neither solidified nor substantially vaporized during the passage of the stream from the high pressure zone to the low pressure zone. It is emphasized that the instant invention is a manipulative, as distinguished from a chemical, process and its applicability and operability is not at all dependent upon or restricted by the composition or nature of the liquid and solid materials, or the temperatures, pressures, or flow rates involved; these things are, of course, determined by the purposes and chemistry of the particular continuous flow process employed. The term "unobstructed elongated conduit" means a conduit of greater length than diameter which has a substantially uniform internal cross-section and a smooth regular surface on its interior, and which is free of abrupt changes in direction, although large radius bends are permissible. Such conduit may, however, include an orifice, venturi, flow tube, or other flow-measuring means the net pressure loss across which is quite negligible compared to the total pressure drop incurred in the main portion of the conduit itself.

The conduit should be elongated so that maximum friction against the walls thereof is obtained and it preferably has a shape which produces a large wetted perimeter and a minimum cross-sectional area. Since the preferred method of varying the viscosity of the flowing liquid is to vary the temperature of the liquid by indirect heat exchange, the large wetted perimeter has a double effect; first, in increasing the amount of flow-retarding film, and second, in increasing the heat transfer surface available for heating and/or cooling the flowing liquid. Even though a tortuous flow path obtained by the use of many fittings and a rough internal surface will increase the friction on the fluid flowing through the conduit and consequently the maximum pressure drop across the length of the conduit, it is preferred to employ a conduit having no abrupt turns or restrictions and smooth regular services on the interior. This is true since the preservation of the solid particles may often be important and because smooth flow lines having no abrupt changes in direction are conducive to preservation of the equipment, erosion usually being most severe at points where a solid particle-bearing stream changes direction.

The accompanying drawings are presented here to further clarify the method and operation of this invention and are intended to be illustrative rather than limiting upon the scope thereof.

FIGURE 1 illustrates the invention in its generic aspect, stripped of all non-essentials, wherein a single heat-transfer zone is used to vary liquid viscosity.

FIGURES 2 and 3 illustrate suitable cross-sectional shapes for the elongated conduit.

FIGURE 6 shows a specific embodiment of the invention wherein the basic control scheme is applied to a process for the manufacture of hydrogel spheres.

Figure 4:
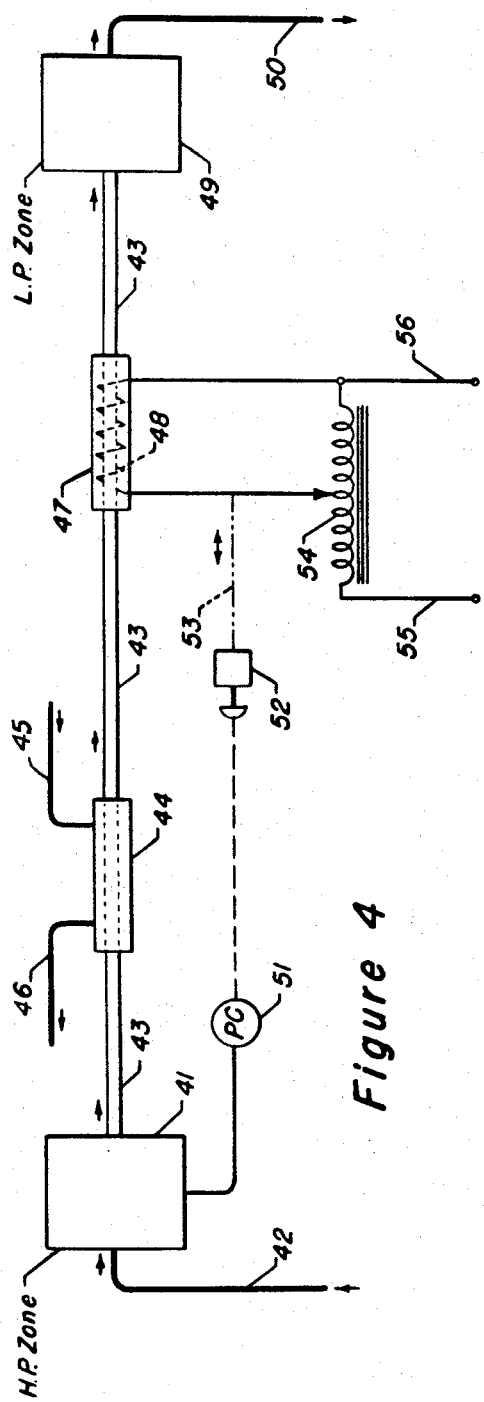
FIGURE 4 illustrates another broad embodiment of the invention employing dual heat-transfer zones.

FIGURE 6-a illustrates another specific embodiment of the invention adapted to the manufacture of hydrogel spheres.

FIGURE 7 depicts still another specific embodiment of the invention in which the basic control scheme is utilized in conjunction with the fractionation section of a fluid catalytic cracking unit.

FIGURE 1 represents a continuous flow process which may be complete in itself or may be but a part of a larger, more inclusive process. In FIGURE 1 there is shown a high pressure zone 1 connected by unobstructed conduit 3 to a low pressure zone 5. Zones 1 and 5 are representative of storage vessels, catalytic reactors, fractionating columns, fired heaters, heat exchangers, pumps, or any other apparatus adapted to contain or operate upon a liquid slurry. Since the process is continuous, zone 1 has at least one inlet stream composed of any fluid, liquid or gas, designated as line 2, and zone 5 has at least one outlet stream, designated as line 6; either zone 1 or zone 5 or both may have additional fluid inlet and/or outlet streams of any composition, or phase. The stream of interest here is the solids-containing liquid stream carried by line 3 from high pressure zone 1 to low pressure zone 5, the flow of which is impelled solely by the pressure differential existing between zones 1 and 5. It is assumed that variations in flow rate through line 3 affect some measurable process variable associated with zone 1, or zone 5, or even some other portion of the overall process not illustrated here. One such variable is the static pressure within zone 1, as measured by pressure controller 12; assuming that zone 1 is a liquid-filled system, or a chamber partially filled with liquid under gas pressure, a decrease in outflow through line 3 will obviously increase the pressure in zone 1, and an increase in outflow will decrease said pressure. Another such process variable is the flow rate of the solids-containing liquid stream itself, as measured by flowmeter 10 and flow controller 11. Other process variables which might be employed are liquid level within zone 1 or zone 5, or the static pressure of zone 5, or, if zone 1 represents a heat exchanger heating some other fluid, the outlet temperature of such heated fluid may be the process variable responsive to the flow rate of the stream in conduit 3. A tubular jacket 4 incloses a portion of, or even substantially the full length of, conduit 3. A suitable heat exchange fluid, which may be either a heating medium or a cooling medium, is passed through line 7 into jacket 4, therein heating or cooling the slurry flowing in conduit 3 by indirect heat exchange, and is withdrawn through line 8 and control valve 9. Conduit 3 is sized so that substantially the entire frictional pressure drop of the slurry stream occurs in conduit 3; in other words, there are no valves, restriction orifices, sharp bends or other protuberances therein to create additional frictional pressure loss other than that effected by the smooth walls of conduit 3. By means of the aforesaid heating or cooling, the temperature of the slurry stream may be raised or lowered and hence its viscosity decreased or increased, respectively. This in effect changes the effective flow resistance of conduit 3 so that it functions as a throttle valve but without change of its internal area.

Pressure controller 12 and flow controller 11 are shown here diagrammatically to illustrate two exemplary process variables which may be controlled by the throttling technique of this invention. These controllers may be pneumatic, electronic, or any suitable, conventional instruments. They are connected to be utilized alternatively, not conjunctively by means of suitable switching means 13 and 14. Suppose, for example, that it is desired to regulate the pressure in zone 1. Switch 13 is closed and switch 14 opened so that control valve 9 is actuated by pressure controller 12. Consider further that a heating fluid is passed through jacket 4. Upon an incipient increase in the pressure of zone 1, pressure controller 12 causes valve 9 to open, admitting more heating fluid through jacket 4, raising the temperature of the stream in conduit 3 and thereby decreasing its viscosity; this reduces the flow resistance of conduit 3 and permits a greater outflow of slurry from zone 1 thereby restoring its pressure to the control point. Conversely, upon an incipient decrease in the pressure of zone 1, pressure controller 12 causes valve 9 to close, permitting less heating fluid to flow through jacket 4, reducing the temperature of the stream in conduit 3 and thereby increasing its viscosity; this increases the flow resistance of conduit 3 and reduces the outflow of slurry from zone 1 thereby increasing said pressure to the control point. Of course, if a cooling fluid is employed in jacket 4 instead of a heating fluid, then the combined action of controller 12 and valve 9 obviously must be reversed. But in either case, the viscosity of the solids-containing liquid flowing through conduit 3 is varied inversely in response to pressure variations in zone 1.

As another example, suppose instead that it is desired to regulate absolutely the rate of flow through conduit 3. Switch 13 is opened and switch 14 closed so that control valve 9 is actuated by flow controller 11. A suitable flow-measuring means 10, which may be an orifice, flow tube or venturi meter is disposed in line 3. Although a flow-measuring means such as an orifice presents some minor obstruction to flow, the permanent pressure loss thereacross is always negligible compared to that expended in the section of conduit 3 downstream therefrom. It will usually be desirable to install the flow-measuring means in an enlarged section of conduit 3 near zone 1, with the remaining downstream portion of conduit 3 being of the requisite smaller but uniform cross-section to produce the desired pressure drop. Consider further that a heating fluid is passed through jacket 4. Upon an incipient increase in flow rate as detected by flow-measuring means 10, flow controller 11 causes valve 9 to close, reducing the rate of flow of heating fluid to jacket 4, thereby lowering the temperature of the stream in conduit 3 and increasing its viscosity; this increases the flow resistance of conduit 3 and reduces the flow rate of slurry therethrough down to the control point. Conversely, upon an incipient decrease in flow rate as detected by flow-measuring means 10, flow controller 11 causes valve 9 to open, admitting more heating fluid through jacket 4, thereby raising the temperature of the stream in conduit 3 and decreasing its viscosity; this reduces the flow resistance of the slurry up to the control point. Where a cooling fluid is employed in jacket 4 instead of a heating fluid, then the combined action of control 11 and valve 9 must, of course, be reversed. But in either case, the viscosity of the solids-containing liquid flowing through conduit 3 is varied directly in response to variations in flow rate.

Low pressure zone 5 may physically be disposed at a higher, or equal, or lower elevation than high pressure zone 1. If at a higher elevation, then the frictional pressure loss expended in conduit 3 will be less than the pressure differential between the zones by the amount attributable to liquid head. If zone 5 is at an equal elevation, then the frictional pressure loss will equal the pressure differential, and if at a lower elevation, the frictional pressure loss will exceed the pressure differential by the amount attributable to liquid head. Arranging the low pressure zone at a higher elevation than the high pressure zone has the advantage that the length of conduit 3 is made a minimum for any specified pressure differential.

FIGURES 2 and 3 illustrate suitable and typical cross-sections for conduit 3, particularly that portion thereof which is surrounded by jacket 4. Of course, when the pressure range which is employed within the high pressure zone 1 is moderate and easily obtained, conduit 3 may be circular in cross-section; however, when large pressure drops must be obtained the total length of conduit 3 may be reduced when cross-sections such as those shown are employed. Referring to FIGURE 2, the cross-section II—II illustrates jacket 4 and slurry-conducting conduit 23 (equivalent to conduit 3 in FIGURE 1). As may be seen, the enlarged perimeter of conduit 23 provides first a great deal of wall area on which flow-retarding film may be encountered, second, a great deal of heat exchange surface so that the slurry flowing through conduit 23 may be rapidly heated or cooled over large temperature ranges, and third, a small dimension through which fluid may flow so that all parts of the fluid stream are fairly close to the heat exchange surface and to a flow-retarding film. A cross-section such as conduit 23 has provided, however, a smooth, unrestricted and unobstructed flow for the particle-form solids and permits them to flow in stream lines and without turbulence or abrupt changes of direction.

Referring to FIGURE 3, there is shown another embodiment wherein conduit 3 of FIGURE 1 is a series of conduits 33 which, although providing adequate cross-section for the flow of material, provide also the large heat transfer surface and small dimension flow path required for retarding the flow. FIGURES 2 and 3 are intended to be illustrative of methods for producing the desired effect and are not intended as an exhaustive disclosure of all variations which are within the scope of the invention or equivalent to the modifications shown.

In some cases, by reason of fixed temperature conditions within the high pressure zone, the temperature of the slurry stream leaving it will be too high and the viscosity too low for satisfactory throttling by viscosity variation, or it may be desired to effect a net cooling of the slurry before it is charged to the low pressure zone, or it may be desired simply to limit the maximum temperature of the slurry. FIGURE 4 is similar to the general flow scheme of FIGURE 1, but modified to accomplish the foregoing objective by precooling the slurry leaving the high pressure zone before it is passed through the control heater. A charge stream is passed through line 42 to high pressure zone 41. Slurry flows through elongated conduit 43 to low pressure zone 49; on the way it is first cooled by precooler 44 to a temperature below that ultimately desired in low pressure zone 49, and is then reheated by control heater 47 and passed to zone 49 from which an effluent stream is withdrawn via line 50. Coolant is passed at a constant rate through line 45 into precooler 44, therein reducing the temperature of the slurry by indirect heat exchange, and is removed therefrom through line 46. Control heater 47, in this embodiment, is an electric heater suitable for laboratory or pilot plant installations and comprises an electric resistance element 48 wound about conduit 43. A variable autotransformer 54 provides a convenient means of supplying varying current to heater 47; primary leads 55 and 56 are connected to a suitable AC power source. A servo-actuator 52 is operatively connected by linkage 53 to the variable secondary arm of autotransformer 54 whereby the voltage supplied to resistance element 48 is made continuously responsive to a control signal obtained from pressure controller 51 and transmitted to actuator 52. The operation of this embodiment is essentially the same as in FIGURE 1, except that the viscosity variation can be affected at a lower temperature level which is independent of the temperature at which the liquid slurry leaves zone 41. If the pressure in zone 41 tends to increase, pressure controller 51 causes more current to flow through heater 47, thereby raising the temperature of the slurry and reducing its viscosity; this in turn reduces the flow resistance of conduit 43 and the resulting increased outflow of slurry therethrough relieves the pressure buildup in zone 41. If the pressure in zone 41 tends to decrease, pressure controller 51 causes less current to flow through heater 47, thereby reducing the temperature of the slurry and increasing its viscosity; this in turn increases the flow resistance of conduit 43 and the resulting reduced outflow of slurry therethrough causes the pressure in zone 41 to increase up to the control point. Various modifications to the embodiment of FIGURE 4 may readily be made. For example, heater 47 may be replaced by a variable cooling means and precooler 44 by a preheater, the action of the controlling elements then being reversed; this enables a cold slurry to be heated en route to the low pressure zone while yet utilizing the viscosity-throttling feature of the present invention. If it is desired to regulate the pressure of zone 49 instead of zone 41, it is only necessary to connect pressure controller 51 to an appropriate pressure tap in zone 49 and to reverse the overall control action. Of course, process variables other than static pressure may be effectively regulated by this general technique, such variables comprising, for example, slurry flow rate, temperature, liquid level, composition, etc.

Figure 5:
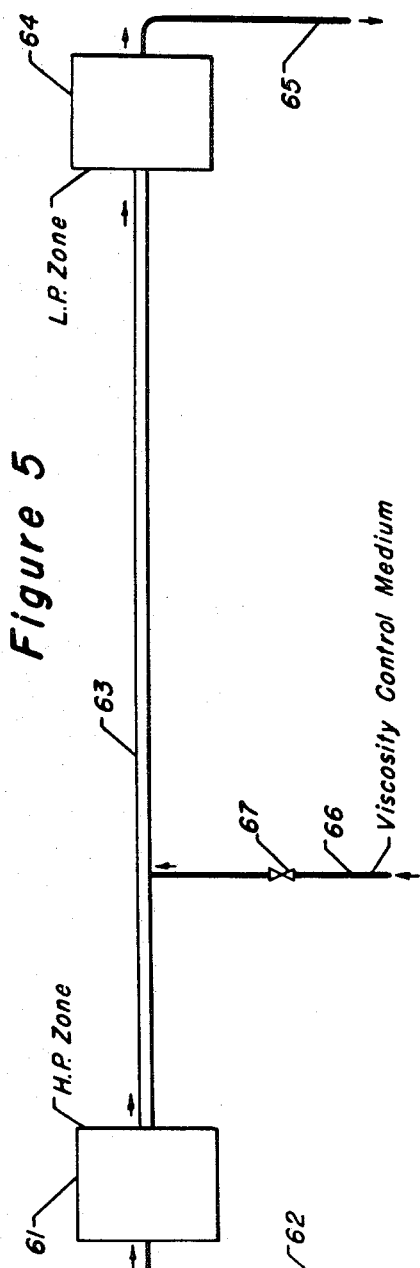
FIGURE 5 shows an alternative method of varying liquid viscosity by employing a viscosity-changing additive.

The embodiments of FIGURES 1 and 4 have been limited to the use of temperature variation as a means of changing liquid viscosity. While this is the preferred mode, an alternative method is to add to the slurry stream, at a regulated but variable rate, a stream of additive having a substantially different viscosity than the liquid slurry. Such technique is illustrated in FIGURE 5. A feed stream is passed through line 62 to high pressure zone 61. Slurry flows through elongated conduit 63 to low pressure zone 64, from which an effluent stream is withdrawn through line 65. A viscosity control medium is charged through line 66 and valve 67 to conduit 63, preferably at the upstream end thereof in order to make the full length of conduit 63 effective for throttling. The viscosity control material or additive may or may not be partially or totally miscible with the liquid to be throttled and may be viscosity-increasing or viscosity-decreasing in nature. Valve 67 may be an automatic control valve actuated by any of the means heretofore described. Thus, the pressure of zone 61 may be regulated by actuating valve 67 in response thereto. If a viscosity-increasing additive is employed, the system is arranged so that an increase in pressure will tend to close valve 67, admitting less additive and decreasing the viscosity of the slurry, thereby resulting in less impedance to flow through conduit 63 and permitting a greater outflow of slurry from zone 61 which reduces the pressure to the control point; a converse behavior obtained for a decrease in pressure. If a viscosity-decreasing additive is employed, the system is arranged so that an increase in pressure will tend to open valve 67, admitting more additive and decreasing the viscosity of the slurry, thereby resulting in less impedance to flow through conduit 63 and permitting a greater outflow of slurry from zone 61 which reduces the pressure to the control point. In other words, where it is desired to control the pressure in zone 61 and a viscosity-increasing additive is employed, the flow rate of the additive stream is varied inversely in response to pressure variations in the high pressure zone; if a viscosity-decreasing additive is employed, the flow rate of the additive stream is then varied directly in response to pressure variations in the high pressure zone. As in the case of FIGURES 1 and 4, process variables other than the pressure of the zone 61 may be regulated by the instant technique. For example, the pressure of low pressure zone 64 may be regulated by actuating valve 67 in response thereto, the overall control action being the reverse of that described in relation to the control of the pressure in zone 61. If the liquid slurry is an aqueous medium, suitable viscosity-increasing additives include methyl cellulose, sodium carboxymethyl cellulose, hydroxyethyl cellulose, starch, dextrine, synthetic polymers such as polyvinyl alcohol or ether, polyacrylic acid salts or esters, and natural gums such as karaya gum, linseed gum, gum tragacanth, etc. If the liquid slurry is a heavy hydrocarbon such as asphalt, crude oil, or heavy distillate, suitable viscosity-decreasing additives include methyl alcohol, ethyl alcohol, and light paraffins such as propane, butane, pentane, hexane, etc. In some cases it may be economically advantageous to separate and recover the viscosity control medium from the liquid slurry after it has reached the low pressure zone, which separation may be accomplished by fractional distillation or crystallization, or any other suitable separation technique, and the resulting separated viscosity control medium then being recycled to line 66 for reuse.

Referring to FIGURE 6, the schematic flow diagram here illustrates a suitable process for manufacturing alumina spheres from alumina hydrosol. Alumina hydrosol may be made by many methods such as by dissolving aluminum metal in aluminum chloride solution until an aluminum to chlorine ratio of about 1.5 is obtained in the solution. The resultant hydrosol will, upon standing, set up into a vibrant hydrogel which is a fragile semisolid substance similar in nature to gelatin. The hydrogel may be dried to form a hard, abrasive, highly porous solid known as alumina or alumina gel. This material is partially hydrated aluminum oxide which is highly porous and adsorbent and has superior characteristics as a catalyst and catalyst base.

It is frequently desired to obtain alumina gel in this form of small spheres, having a major dimension of from about 1/32 inch to about 1/4 inch, and when this form of alumina gel is desired, it is obtained by introducing small droplets of alumina hydrosol into a medium which accelerates its gelling so that as the droplets pass through the medium, they set to a hydogel which upon drying is converted to the hard gel form. While in hydrogel form the spheres are fragile and must be handled very carefully to avoid their destruction. Furthermore, the gelation must be effected very rapidly since it must occur while the droplets of hydrosol are in a free fall through a gelling medium.

In order for this process to be effected successfully, it has been found that the gelling of the hydrosol droplets must be accelerated by high temperature, by alkaline environment or preferably by both. Accordingly, hydrosol has been mixed with hexamethylenetetramine which is a neutral substance that decomposes under hot conditions to form ammonia, the required alkaline substance. The hydrosol mixed with hexamethylenetetramine is dispersed into an extremely hot medium, such as a column of oil maintained at temperatures up to about 600° F. and at these conditions both the heat and the alkalinity accelerate the gelation reactions. In order to maintain both the oil and the aqueous hydrosol in liquid phase at these temperatures, however, it is necessary to impose a pressure on the vessel in which they are contained and it is then necessary to remove the hydrogel spheres continuously from that vessel to a zone at atmospheric pressure without destroying the spheres that are formed, as would be the case for example, if they were passed through the restriction of a throttle valve. It is also necessary to continuously remove the spheres because building up deep beds of them in the bottom of a reaction zone causes the lowermost of the spheres to be crushed, permits too brief a period for forming and encourages agglomeration of the spheres if they are not completely gelled when they come in contact with each other.

Having that background in mind, FIGURE 6 illustrates a vessel 71 which is a forming and aging tower for preparing hydrogel spheres and which contains hot oil such as paraffinic hydrocarbon oils boiling between 500° F. and 700° F. Alumina hydrosol is introduced through line 72 and passes through a spray-head or dropping tip within the vesel wherein it is distributed into the hot oil as individual droplets of hydrosol. During the droplets' descent through vessel 71, which may be maintained at a temperature of about 300° F. and at a pressure sufficient to maintain both oil and hydrosol in the liquid phase, usually from about 25 p.s.i. to about 200 p.s.i., the droplets are converted into hydrogel spheres and as they descend through the vessel the gelation reactions are effected to such an extent that the spheres are nonagglomerating and firm.

The gelled hydrogel spheres are no longer soluble in an aqueous medium and they may be removed from the forming vessel in such aqueous medium when desired. In such cases, the hot oil column in vessel 71 is maintained above an aqueous layer so that an interface between water and oil exists somewhere in the lower portion of vessel 71. The formed hydrogel spheres pass from the oil phase into the aqueous phase and discharge from conduit 73 into line 74 wherein the flowing stream of water or aqueous medium is maintained.

The liquid stream in which the particles of hydrogel are entrained passes upwardly through conduit 74 in the stream of water or aqueous material entering conduit 74 from line 77. Conduit 74 changes direction from horizontal to vertical in a non-abrupt, large radius curve and has a shape which retards flow but does not obstruct the path of flow. Conduit 74 passes through a jacket 75. A coolant is introduced into jacket 75 through line 86 and control valve 82, and is withdrawn therefrom through line 85, so that the temperature of the stream in column 74 may be lowered by indirect heat exchange. The cooling of the stream increases its viscosity and consequently its resistance to flow so that the pressure required to pass the stream from the intersection of conduits 73 and 74 to the top of conduit 74 increases due to the cooling. Conduit 74 then passes into a sphere separating chamber 76 wherein the aqueous medium is removed, in this case through line 77 which discharges responsive to variations in the level in vessel 76 as measured by level controller 79 which operates motor control valve 78 in line 77. The aqueous material in line 77 is returned via pump 87 to the intersection of line 73 and line 74 to repeat the cycle while the hydrogel spheres are removed from vessel 76 through line 84. Vessel 76 preferably has a large cross-section compared with the cross-section of conduit 74 so that the vertically rising spheres may be decelerated and may gently settle to the bottom of vessel 76 for removal. Vessel 76 may be replaced with other means for continuously removing the hydrogel spheres from the stream such as a moving screen or belt upon which the stream discharges or a series of collecting boxes or baskets which continuously remove spheres from the separation zone.

A pressure controller 83 senses the pressure in vessel 71 and acts responsive to variations in that pressure to vary the rate at which coolant is introduced into jacket 75 via line 86 by adjusting the opening of valve 82. When the pressure in vessel 71 diminishes, valve 82 will open thereby increasing the cooling of liquid passing through conduit 74 which in turn increases its viscosity and, therefore, the pressure required to pump liquid through conduit 74. Increasing the discharge pressure required for pump 87 automatically increases the pressure within vessel 71 thereby accomplishing the purpose of this invention. Similarly, when the pressure in vessel 71 is too high, valve 82 closes so that less cooling is effected in jacket 75 which causes a corresponding decrease in the viscosity of the liquid flowing through conduit 74 which in turn reduces the pressure necessary to force that liquid to flow through conduit 74.

Although this embodiment of the invention has been explained thus far with an aqueous phase passing through conduit 74, the process may be operated entirely with hydrocarbon. By way of example, the oil in column 71 may be continuously withdrawn with the spheres and separated from them in vessel 76 as the aqueous phase was separated; however, pump 87 in the case of an all-oil system may return the oil through a heater and to the upper portion of column 71 so that it may be used as part of the gelling medium in addition to being used as the transporting liquid. As another variation of this process, when a hydrocarbon oil is employed, both as the reacting medium and as the transporting liquid, a viscosity-increasing additive, for example high-boiling normal paraffins, may be added to the oil so that the transporting liquid will experience a large change in viscosity per unit change in temperature. Additional facilities may be employed to separate the straight-chain normal paraffinic hydrocarbons from the forming oil before returning the latter to column 71 when such separation is desired.

The following example is presented to illustrate one specific mode of operation the embodiment of FIGURE 6 and it is intended to be illustrative rather than limiting upon its broad scope.

An alumina hydrosol of suitable composition is pumped into the top of a pressure vessel and discharged through multiple dropping tips into a hot hydrocarbon oil which is maintained at a temperature of 300° F. The hydrocarbon oil employed is a straight run paraffinic fraction boiling from about 450° F. to about 750° F. As the droplets of hydrosol descend through the column of oil they set to firm hydrogel spheres which eventually pass from the bottom of the forming zone through a conduit and into a transfer line. A portion of the oil, which has a viscosity of about 5 centipoises at the sphere-forming temperature, also passes from the forming zone and through the transfer line. The hydrogel spheres entrained in this oil pass upwardly through the transfer line which has only gradual bends for changing direction of flow, and then through a cooling jacket and ultimately to a moving screen which filters the hydrogel spheres from the entraining oil stream.

The enlongated transfer conduit extends 35 feet above the cooling jacket and is cooled with cooling water, however, Freon or other coolants may be employed when lower temperature ranges are desired. The coolant rate is varied responsive to pressure variations within the forming vessel, the coolant rate increasing as the pressure becomes lower and the coolant rate decreasing of the pressure increases. The forming vessel is maintained at 100 p.s.i. which requires that the oil have a viscosity of about 80 centipoises in passing through the transfer conduit. The coolant, in order to maintain this pressure, must reduce the temperature of the flowing hydrogel stream to between 80 and 100° F., depending on the flow rate of the stream and the particle loading.

The pressure in the forming tower may be changed by changing the temperature of the entraining liquid; however, for large changes of pressure, for example, if it is desired to operate at 200 lbs. instead of 100 lbs. it may be necessary to change the character of the entraining liquid, i.e., employ one having a substantially higher viscosity and, therefore, higher resistance to flow.

FIGURE 6–a illustrates a variant of the hydrogel manufacturing process of FIGURE 6, wherein hydrogel sphere level or inventory within tower 71 is the primary controlled variable instead of pressure. This arrangement permits a more direct control of sphere residence time. Sphere level is detected by a capacity type level controller 88 having an elongate vertical capacitance probe 89 extending into tower 71 a sufficient distance to bridge the elevation range to be controlled. If the sphere level tends to increase, level controller 88 causes valve 82 to assume a more closed position, cutting back the cooling of liquid passing through conduit 74, thereby decreasing its viscosity and increasing its rate of flow; this in turn increases the rate in which spheres are withdrawn from tower 71 by venturi action at the intersection of conduits 73 and 74, and restores the sphere level substantially to the control point. If the sphere level tends to decrease, level controller 88 causes valve 82 to assume a more open position, increasing the cooling of liquid passing through conduit 74, thereby increasing its viscosity and decreasing its rate of flow; this in turn reduces the rate at which the spheres are withdrawn from tower 71 and again restores the sphere level substantially to the control point. A radioactivity type interface detector may be employed to detect sphere level instead of a capacitance probe, if desired.

FIGURE 7 shows only so much of the fractionation section of a conventional fluid catalytic cracking unit as is necessary to illustrate how the present invention may be adapted thereto. Main column 90, of which only the lower portion is illustrated here, is a conventional fractionating column receiving as feed the hot vaporous cracking products passed thereto directly from the reactor; unstabilized gasoline and lighter hydrocarbons are taken overhead and one or more side cut streams such as light cycle oil and heavy cycle oil may be withdrawn from intermediate points in the column. The reactor effluent vapors charged to the column contain catalyst fines, such as 88–12 silica-alumina cracking catalyst, entrained therein which tend to settle out and accumulate in the bottom of column 90. The column bottoms, which are quite hot, are preferably circulated through a closed-circuit steam generation system in order to utilize available heat and to maintain the main column in heat balance. Unless means are provided for removing catalyst fines at the same rate at which they enter the column via the feed, the bottom trays of the column, attendant piping, and steam generator tubes would soon become clogged with catalyst fines. Accordingly, it is customary to withdraw a slipstream of column bottoms or "slurry," pass it through a settling or concentration zone to build up the catalyst concentration thereof, and return the concentrated slurry to the reactor, usually in admixture with the raw oil charge and/or the heavy cycle oil recycle stream. The slurry recycle flow is conventionally regulated by a flow control loop including an orifice-type flow controller and an on-line motor control valve. Since the catalyst fines are extremely hard and abrasive and are present in relatively high concentration, the throttling of this stream by valve means is one of the most severe valve services to be encountered in any commercial process. The most exacting specifications must be followed in the design and fabrication of a valve suitable therefor—angle-type construction, full-venturi throat, use of superhard alloys for facing the plug, stem, and seat ring, flushing oil connections, valve positioner, heat transfer fins for the valve bonnet, and sundry other special and costly features, all of which run the first cost of the valve up to two or three times that of a valve of the same size for nonslurry service. Even with all these precautions, the valve internals must be periodically replaced at intervals measured in weeks.

The need for this control valve is eliminated by means of the present invention. In FIGURE 7, hot slurry is withdrawn from the lower portion of column 90 through line 91 and is pumped by pump 92 through line 93 into slurry settler 94. Clarified oil is withdrawn from the upper portion of settler 94 and sent to storage through line 95. Concentrated slurry is passed from the lower portion of settler 94 into and through conduit 96, which passes through a cooling jacket 98, and thence through line 103 to be returned to the catalytic reactor. A flow-measuring orifice 97 is disposed in conduit 96, preferably near the outlet of slurry settler 94. That portion of conduit 96 which is downstream from orifice 97 is unobstructed and of sufficient length and of such diameter that substantially all of the total frictional pressure drop undergone by the slurry in passing from the slurry settler to the reactor is expended therein, just as it would be so expended across a throttle valve if one were used; this excludes the small entrance and exit losses incident to flow entering and leaving conduit 96, and the very small irreversible pressure drop across orifice 97. A suitable cooling fluid, which may be boiler feed water to be preheated before being charged to the steam generator, is passed through line 99 into jacket 98 and is removed therefrom through line 100 and motor control valve 101. A flow-controller 102 actuates valve 101 in response to the flow rate of slurry as detected by orifice 97. If the flow rate of slurry tends to decrease below the control point, flow controller 102 causes valve 101 to assume a more closed position, decreasing the rate of flow of coolant through jacket 98, thereby asbstracting less heat from the slurry stream and decreasing its viscosity; the decreased viscosity results in decreased effective flow resistance of conduit 96 which causes the flow of slurry to raise to the control point. Conversely, if the flow rate of slurry tends to increase above the control point, flow controller 102 causes valve 101 to assume a more open position, causing more coolant to pass through jacket 98, abstracting more heat from the slurry stream, thereby increasing the viscosity of the slurry stream and increasing the effective flow resistance of conduit 96 which throttles back the flow of slurry to the control point.

It may thus be seen that the present invention provides a simple method for throttling a slurry stream without having to use a throttle valve which is subject to the extremely erosive effects thereof. About the only piece of apparatus which will need replacement is the orifice plate—a simple and inexpensive task which can be done on a regular maintenance schedule; alternatively, a flow tube or venturi tube may be employed instead of an orifice plate, the former devices having a much longer useful life but at higher cost. The present invention as typified in the embodiment of FIGURE 7 is also advantageous in that it combines the functions of a heat exchanger with a control loop; that is, the heat abstracted from the slurry incident to flow control purposes is used to raise the temperature of some other process stream such as boiler feed water, raw oil charge to the reactor, etc.

I claim as my invention:

1. In a continuous flow process including the step of passing a liquid stream containing particle-form solids from a high pressure zone to a low pressure zone, the method of regulating the flow rate of said liquid stream which comprises:
   (1) sensing said flow rate in relation to a predetermined control point;
   (2) passing the liquid stream from said high pressure zone to said low pressure zone through an unobstructed elongated conduit, expending in said conduit as frictional pressure loss substantially the entire portion of the total frictional pressure drop undergone by said liquid stream in its passage between said zones; and
   (3) upon incipient variation in said sensed flow rate, changing the viscosity of the liquid in said conduit in a manner to restore said flow rate to said control point, the effective flow resistance of said conduit being increased upon raising said viscosity and decreased upon lowering said viscosity.

2. The method of claim 1 wherein the viscosity of the liquid in said conduit is changed by varying the temperature of said liquid inversely in response to incipient variations in the flow rate of said liquid stream.

3. In a continuous flow process including the step of passing a liquid stream containing particle-form solids from a high pressure zone to a low pressure zone, the method of regulating the pressure in said high pressure zone which comprises:
   (1) sensing said pressure in relation to a predetermined control point;
   (2) passing the liquid stream from said high pressure zone to said low pressure zone through an unobstructed elongated conduit, expending in said conduit as frictional pressure loss substantially the entire portion of the total frictional pressure drop undergone by said liquid stream in its passage between said zones; and
   (3) upon incipient variation in said sensed pressure, changing the viscosity of the liquid in said conduit in a manner to restore said pressure to said control point, the effective flow resistance of the conduit being increased upon raising said viscosity and decreased upon lowering said viscosity.

4. The method of claim 3 wherein the viscosity of the liquid in said conduit is changed by varying the temperature of said liquid directly in response to incipient pressure variations in said high-pressure zone.

5. In a process for forming hydrogel spheres wherein a hydrosol is introduced in the form of droplets to a gelling medium maintained as a column within a pressure vessel and the resulting hydrogel spheres are transferred to a zone of lower pressure, the method of transferring such spheres which comprises:
   (1) discharging the hydrogel spheres from the lower portion of said column through an unobstructed passageway into a flowing stream of liquid;
   (2) passing the liquid stream containing the hydrogel spheres in suspension upwardly through unobstructed elongated conduit to said zone of lower pressure, expending in said conduit as frictional loss substantially the entire portion of the total frictional pressure drop undergone by said liquid stream in its passage to said lower pressure zone;
   (3) sensing the pressure in said vessel in relation to a predetermined control point; and
   (4) upon incipient variation in said sensed pressure, changing the viscosity of the liquid in said conduit in a manner to restore said pressure to said control point, the effective flow resistance of said conduit being increased upon raising said viscosity and decreased upon lowering said viscosity.

6. The method of claim 5 wherein the viscosity of the liquid in said conduit is changed by varying the temperature of said liquid directly in response to incipient pressure variations in said vessel.

7. In a process for forming hydrogel spheres wherein a hydrosol is introduced in the form of droplets to a gelling medium maintained as a column within a pressure vessel and the resulting hydrogel spheres are transferred to a zone of lower pressure, the method of transferring said spheres which comprises:
   (1) discharging the hydrogel spheres from the lower portion of said column through an unobstructed passageway into a flowing stream of liquid;
   (2) passing the liquid stream containing the hydrogel spheres in suspension upwardly through an unobstructed elongated conduit to said zone of lower pressure, expending in said conduit as frictional pressure loss substantially the entire portion of the total frictional pressure drop undergone by said liquid stream in its passage to said lower pressure zone;
   (3) sensing the level of hydrogel spheres in said vessel in relation to a predetermined control point; and
   (4) upon incipient variation in said sensed sphere level, changing the viscosity of the liquid in said conduit in a manner to restore said sphere level to said control point, the effective flow resistance of said conduit being increased upon raising said viscosity and decreased upon lowering said viscosity.

8. The method of claim 7 wherein the viscosity of the liquid in said conduit is changed by varying the temperature of said liquid directly in response to incipient sphere level variations in said vessel.

References Cited

UNITED STATES PATENTS

| | | | |
|---|---|---|---|
| 1,881,200 | 10/1932 | Leask et al. | 137—340 X |
| 1,975,937 | 10/1934 | Graham | 137—340 X |
| 2,042,860 | 6/1936 | Peabody et al. | 137—340 X |
| 2,446,783 | 8/1948 | Payne | 252—317 X |

LEON D. ROSDOL, *Primary Examiner.*

RICHARD D. LOVERING, *Assistant Examiner.*